(12) United States Patent
Law

(10) Patent No.: US 11,763,119 B2
(45) Date of Patent: Sep. 19, 2023

(54) ULTRASONICALLY WELDED LABEL SYSTEMS AND METHODS

(71) Applicant: AVERY DENNISON RETAIL INFORMATION SERVICES, LLC, Mentor, OH (US)

(72) Inventor: Yuk Yu Law, Mentor, OH (US)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

(21) Appl. No.: 16/668,446

(22) Filed: Oct. 30, 2019

(65) Prior Publication Data

US 2020/0134408 A1    Apr. 30, 2020

Related U.S. Application Data

(60) Provisional application No. 62/752,830, filed on Oct. 30, 2018.

(51) Int. Cl.
| | | |
|---|---|---|
| *G06K 19/02* | (2006.01) | |
| *B29C 65/08* | (2006.01) | |
| *B29L 31/00* | (2006.01) | |

(52) U.S. Cl.
CPC .......... *G06K 19/027* (2013.01); *B29C 65/086* (2013.01); *B29L 2031/744* (2013.01)

(58) Field of Classification Search
CPC ................ G06K 19/00; G06K 19/027; G06K 19/07749; G06K 19/0775; G06K 19/07758; G06K 19/077; G06K 19/02; G06K 19/0776; G08B 13/2402; G08B 13/2405; G08B 13/2414; G08B 13/2417; G08B 13/244; G08B 13/2442; G08N 13/2437; B32B 37/00; B32B 37/02; B32B 37/12; B32B 37/18; H01P 11/00; H01Q 17/00

See application file for complete search history.

(56) References Cited

U.S. PATENT DOCUMENTS

| | | | | |
|---|---|---|---|---|
| 8,881,373 B1 * | 11/2014 | Koepp | ..................... | H01P 11/00 |
| | | | | 29/600 |
| 9,460,381 B2 * | 10/2016 | Arimura | ................. | H01Q 13/10 |
| 9,704,079 B2 | 7/2017 | Elbaz et al. | | |
| 9,846,833 B1 * | 12/2017 | Koepp | ..................... | H01P 5/028 |
| 9,902,512 B2 | 2/2018 | Baroncini | | |

(Continued)

FOREIGN PATENT DOCUMENTS

| | | |
|---|---|---|
| KR | 100634758 | 9/2006 |
| KR | 20110040270 | 4/2011 |

OTHER PUBLICATIONS

International Preliminary Report on Patentability dated Apr. 27, 2021 issued in corresponding IA No. PCT/US2019/058744 filed Oct. 30, 2019.

(Continued)

*Primary Examiner* — Van T Trieu

(57) ABSTRACT

Systems and methods of using ultrasonic welding to form labels with RFID tags are disclosed. The methods can be useful for the production of a large volume of labels such as production with roll-to-roll processing. The labels can be useful for consumer products such as garments. The present invention discloses in one embodiment, a label having a first and second printed fabric label layer such that a radio frequency identification (RFID) inlay is disposed between the two printed fabric layers.

20 Claims, 2 Drawing Sheets

(56) References Cited

U.S. PATENT DOCUMENTS

| | | | |
|---|---|---|---|
| 9,902,521 B2 | 2/2018 | Moliski et al. | |
| 2002/0066585 A1 | 6/2002 | Reid et al. | |
| 2003/0136503 A1 | 7/2003 | Green | |
| 2004/0238098 A1 | 12/2004 | Bleckmann et al. | |
| 2007/0159332 A1* | 7/2007 | Koblasz | G08B 21/0275 340/572.1 |
| 2009/0038735 A1 | 2/2009 | Kian | |
| 2009/0213027 A1* | 8/2009 | Finn | G06K 19/0775 343/866 |
| 2009/0242647 A1* | 10/2009 | Kim | G06K 19/07749 235/492 |
| 2010/0079286 A1 | 4/2010 | Phaneuf | |
| 2011/0114734 A1 | 5/2011 | Tiedmann et al. | |
| 2012/0080527 A1* | 4/2012 | Finn | H01P 11/001 235/492 |
| 2012/0234921 A1 | 9/2012 | Tiedmann et al. | |
| 2014/0103116 A1 | 4/2014 | Martin et al. | |
| 2015/0278671 A1* | 10/2015 | Martin | G06K 19/027 29/601 |
| 2015/0278971 A1 | 10/2015 | Martin et al. | |
| 2016/0148086 A1* | 5/2016 | Clarke | G06K 19/027 235/492 |
| 2017/0305068 A1* | 10/2017 | Caldwell | B29C 69/001 |
| 2017/0344864 A1 | 11/2017 | Forster | |
| 2019/0057289 A1* | 2/2019 | Bauer | G08B 13/2445 |

OTHER PUBLICATIONS

International Search Report and Written Opinion dated Jan. 30, 2020 issued in corresponding IA No. PCT/US2019/058744 filed Oct. 30, 2019.

* cited by examiner ial utility patent application No. 62/752,830 filed Oct. 30, 2018, which is incorporated herein by reference in its entirety.

ULTRASONICALLY WELDED LABEL SYSTEMS AND METHODS

CROSS REFERENCE TO RELATED APPLICATION(S)

The present application claims priority to and the benefit of Unites States provisional utility patent application No. 62/752,830 filed Oct. 30, 2018, which is incorporated herein by reference in its entirety.

TECHNICAL FIELD

The subject application generally relates to systems and methods for generating printed labels, and specifically to systems and methods of using ultrasonic welding to secure Radio Frequency Identification ("RFID") devices to printed labels.

BACKGROUND

Consumer products, such as, but not limited to, garments and textiles, include labels with indicia detailing information such as the garment size, the country of origin, brand information, and instructions on how to care for the product. Manufacturers, or intermediates, purchase labels in bulk for placement on products for easy identification and tracking of products in the marketplace. Labels are generated in batches, or runs, that can include thousands of labels and are often delivered in rolls from which individual labels can be cut and then secured to the products.

Radio Frequency Identification (RFID) tags may be remotely powerable transponders which can be useful for inventory management, supply chain monitoring, security, point of sale processes, and other applications.

SUMMARY

According to certain embodiments, a label includes a first printed fabric layer, a second printed fabric layer ultrasonically welded to the first printed fabric layer, and a radio frequency identification ("RFID") inlay disposed between the first printed fabric label layer and the second printed fabric layer. The label can include an adhesive configured to secure the RFID inlay to the first printed fabric layer. The label can include one or more waterproof layers disposed between the RFID inlay and one or both of the printed fabric layers.

In certain other embodiments, a roll-to-roll processing apparatus includes a lamination roll that is configured to receive a first printed fabric layer, an RFID inlay, and a second printed fabric layer and press the RFID inlay between the first printed fabric label layer and the second printed fabric label layer to form a joined label. The roll-to-roll processing apparatus includes one or more ultrasonic welders configured to weld portions of the second printed fabric label to the first printed fabric layers against corresponding rotary anvils to form a continuous web of individual labels. The roll-to-roll processing apparatus can include an edges slitting roller that trims the sides of the continuous web, and a sonic knife configured to separate individual labels from the continuous web.

According to yet other embodiments, a method includes receiving a first printed fabric label layer, a plurality of RFID inlays, and a second printed fabric label layer by a lamination roller. The method further includes joining the first printed fabric label layer, the plurality of RFID inlays, and the second printed fabric label layer by the lamination roller. The method further includes ultrasonically welding portions of the second printed fabric layer to the first printed fabric layer against a rotary anvil by an ultrasonic welder so as to seal one or more RFID inlays between the first printed fabric layer and the second printed fabric layer and form a continuous web of individual labels each containing at least one RFID inlay. The method can include trimming the edge of the continuous web by an edge slitting roller and separating individual labels from the continuous web by a sonic knife.

BRIEF DESCRIPTION OF THE DRAWINGS

Various embodiments will become better understood with regard to the following description, appended claims, and accompanying drawings.

DETAILED DESCRIPTION

Systems and methods are disclosed herein which describe ultrasonic welded labels including RFID tags. As can be appreciated, it can be advantageous for labels, such as garment and textile care labels, to include RFID tags to improve inventory management, supply chain monitoring, and security. Use of ultrasonic welding can facilitate the formation of labels with improved stiffness and improved durability compared to known labels incorporating RIFD tags. The methods described herein can be particularly useful for roll-to-roll processing.

The systems and methods are described in detail including by reference to FIGS. 1 to 6. It will be appreciated that modifications to disclosed and described examples, arrangements, configurations, components, elements, apparatuses, devices methods, systems, etc. can suitably be made and may be desired for specific applications etc. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

Generally, the systems and methods described herein detail the formation of RFID-containing labels using ultrasonic welding to bond one or more layers of the label together. Use of ultrasonic welding, as opposed to the use of an adhesive, can facilitate the formation of RFID-containing labels with desirable stiffness, durability, and ease of manufacturing as well as improved design. Ultrasonic welding can facilitate such improvements by offering variable adhesion strength to bonded surfaces in addition to being well suited for roll-to-roll manufacturing.

Figure 1:
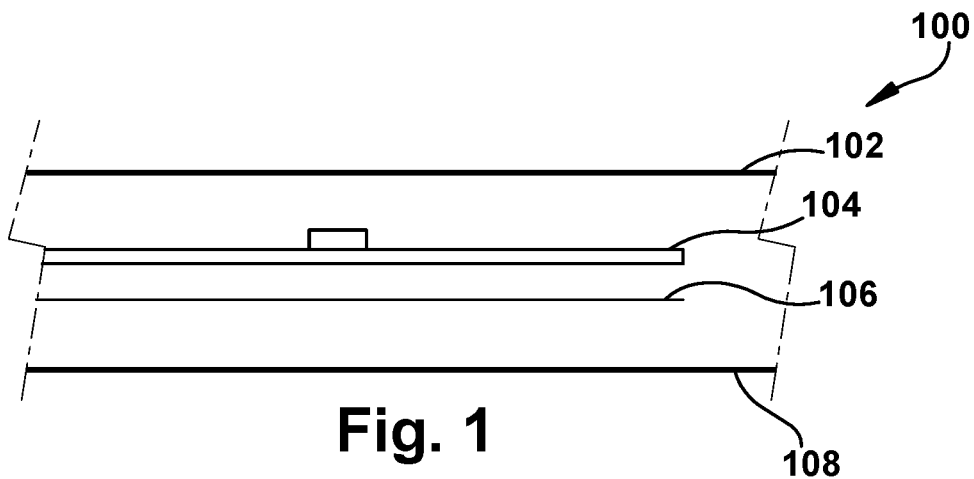
FIG. 1 depicts a first embodiment of a printed fabric label with an RFID device.
Figure 2:
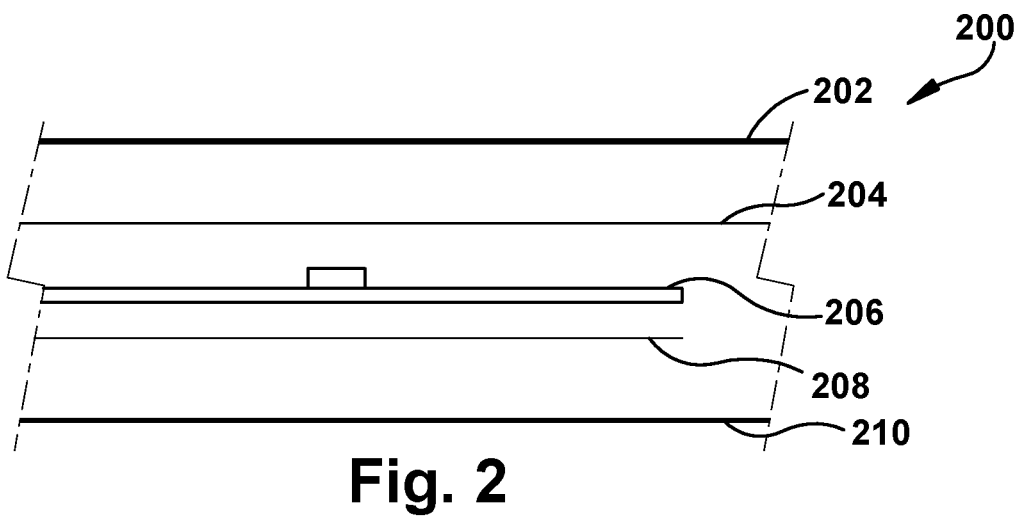
FIG. 2 depicts a second embodiment of a printed fabric label with an RFID device.
Figure 3:
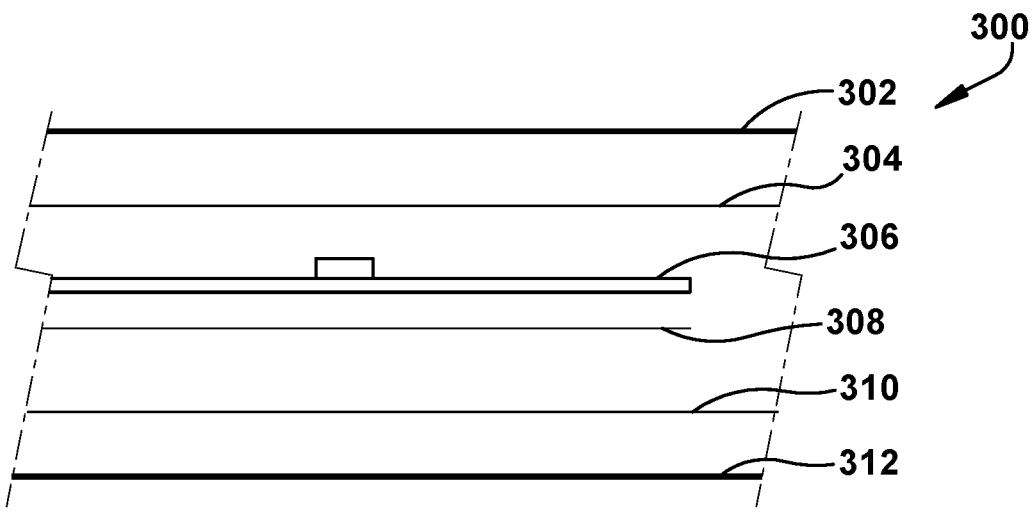
FIG. 3 depicts a third embodiment of a printed fabric label with an RFID device.

The labels described herein can generally include any labels with more than one layer, including labels with two or three layers. It is important to note that the present invention is not limited to any number of layers. Labels which can be formed using the techniques described herein can include multilayer printed fabric labels as well as multilayer labels formed of other materials such as wood, paper or carbon fiber which exhibit sufficient flexibility and softness. FIGS. 1 to 3 depict multilayer printed fabric labels including layers of printed fabric, an RFID tag, adhesive, and optionally, waterproof layers.

In certain embodiments, the labels can be particularly advantageous for use as a fabric label which can be attached to a garment. As can be appreciated however, the methods described herein can be adapted to alternatively form labels for other applications as well.

Referring now to FIG. 1, a first embodiment of a printed fabric label 100 with at least one RFID device is presented. The label 100 includes a top layer 102 and a bottom layer 108. In one embodiment contemplated present the top layer 102 and the bottom layer 108 are both made out of fabric, and in another embodiment presently contemplated both layer 102 and 108 are printed fabric labels however the present invention is not limited to such. When the label 100 is attached to a garment, artwork may be printed on the outward facing sides of the layers 102, 108 and may provide consumers with information detailing the garment size, the country of origin, brand information, and instructions on how to best care for the garment. In certain embodiments, the label 100 includes at least one printable surface for artwork. The layers 102, 108 may be continuous lengths of fabric that have the desired artwork printed periodically along the length of fabric. Generally, the label 100 can be formed of any known fabric material and ink as known in the art.

At least one Radio Frequency Identification (RFID) inlay 104 is disposed between the top layer 102 and the bottom layer 108. If there are a plurality of inlays present, the inlays 104 are periodically spaced so as to substantially align with the artwork in the printed fabric layers 102, 108. In certain embodiments, the at least one RFID inlay 104 can be carried on a continuous length of substrate that includes RFID devices disposed periodically along the length of the substrate. As would be appreciated in the art, any suitable RFID device known in the art can be used for the RFID inlay 104. For example, an RFID inlay 104 can include at least one RFID chip that are each in electrical communication with a suitable RFID antenna of any particular size or shape such as a dipole antenna. The RFID inlay 104 can also use RFID straps in electrical communication with corresponding RFID antennas for attachment of the RFID chip to the antenna. In embodiments, multiple RFID inlays 104 can be disposed within each individual printed fabric label 100. For example, multiple RFID inlays 104 can be used for different applications and each can use a different frequency.

The RFID inlay 104 can include an adhesive layer 106 configured to secure the RFID inlay 104 to the bottom printed fabric layer 108. In certain configurations, the adhesive layer 106 can be configured to secure the RFID inlay 104 to the top printed fabric layer 102, or, additionally or alternatively, multiple adhesive layers can be used as would be understood in the art. The adhesive layer 106 can generally be formed of any known adhesive such as, for example, a pressure-sensitive adhesive ("PSA"), a reactive adhesive, or a hot-melt adhesive. The present invention contemplates that the adhesive layer 106 can be pattern or curtain coated. In one embodiment the adhesive layer 106 is in the shape of the RFID antenna The adhesive layer 106 can advantageously prevent the RFID inlay 104 from moving once the top layer 102 and the bottom layer 108 are ultrasonically welded together as discussed in greater detail below. Advantageously, ultrasonically welding the layers 102, 108 allows the RFID inlay 104 to remain intact even after multiple laundry washing and drying cycles when the RFID tag is attached to an article of clothing. In certain embodiments, the label 100 which may also be referred throughout as a printed fabric label 100, can be configured to withstand different environments. For example, the strength and properties of the adhesive can be selected based on a desired chemical, thermal, and ultraviolet resistance profile.

Referring now to FIG. 2, a second embodiment of a printed fabric label 200 with an RFID device is presented. The printed fabric label 200 includes a top printed fabric layer 202, an RFID inlay 206, and a bottom printed fabric layer 210 as disclosed above. The printed fabric label 200 also includes a waterproofing layer 204 configured to act as a water barrier for the RFID inlay 206. In embodiments the waterproofing layer 204 can be a film, such as a plastic film, that is applied to the top printed fabric layer 202. In one embodiment, the film is constructed using polyurethane. The waterproofing layer 204 can prevent damage to the RFID chip and antenna of the RFID inlay 206 when the label 200 is in contact with water. In addition to ensuring operation of the RFID inlay 206, the waterproofing layer 204 can also prevent possible discoloration of the printed fabric label 200 after a user washes a garment that includes a printed fabric label 200. Advantageously, the waterproofing layer 204 can allow the RFID chip and antenna of the RFID inlay 206 to remain operational even after multiple laundry washing and drying cycles. In certain embodiments, the printed fabric label 200 can include an adhesive layer 208 as disclosed above. In certain embodiments, the adhesive layer 208 can be configured to function as a water barrier for the RFID inlay 206 and can obviate the need to include a separate waterproofing layer 204.

In certain embodiments, the RFID inlay 206 can be carried on a substrate and the substrate can similarly function as a water barrier. For example, the substrate can include at least two portions that can be folded together about a centerline and welded together. In this example, the substrate can be configured to protect the RFID inlay 206 during the welding. The weld can be configured to seal the RFID inlay 206, or a separate material such as an epoxy can be placed over the RFID inlay 206 as waterproofing. An example of a suitable material for such substrates is Gore-tex® manufactured by W.L. Gore and Associates (Newark, Del.). As can be appreciated, in other variations, the substrate can include additional fold lines any of which can be folded together and ultrasonically welded.

Advantageously, ultrasonically welding the layers 202, 210 can form a waterproof seal around the RFID inlay that prevents water from reaching the RFID inlay 206. In certain embodiments, some or all of the layers can be welded in a configuration that secures the layers together, but which does not surround the RFID inlay 206. In various embodiments, the weld can be made at any suitable place on the printed fabric label 200 including at the edges, disposed inward a short distance from the edges, or in any desirable pattern or placement on the printed fabric label 200. In one embodiment, the label is welded around at least four edges. The present invention also contemplates that the label is not welded around its total perimeter but rather only select edges. The welds can be continuous or intermittent.

Referring now to FIG. 3, a third embodiment of a printed fabric label 300 with an RFID device is presented. The printed fabric label 300 includes a top printed fabric layer 302, an RFID inlay 306, and a bottom printed fabric layer 312 as disclosed above. The printed fabric label 300 includes a first waterproofing layer 304 and a second waterproofing layer 310, each of which is configured to act as a water barrier for the RFID inlay 306 as describe above. The printed fabric label 300 can include an adhesive layer 308 as disclosed above. The adhesive layer 308 and the substrate of the RFID inlay 306 can similarly function as water barriers.

As can be appreciated, the printed fabric layers of FIGS. 1 to 3 can be substituted by other known layers such as those formed of plastic, paper, etc. provided they are suitable for the desired end use. For example, softened plastic may be useful for certain garments. Use of such layers may obviate the need to include adhesive and/or waterproofing layers as such materials may inherently provide such functionality.

Generally, ultrasonic welds can be made as known in the art. For example, suitable ultrasonic welding machines to form the ultrasonic welds described herein include those described in U.S. Pat. No. 9,902,512 B2 and U.S. Patent App. Pub. No. 2017/0305068 A1 which are each incorporated herein by reference.

The methods described herein are particularly advantageous for volume production and can be made using, for example, a roll-to-roll processing system.

Figure 4:
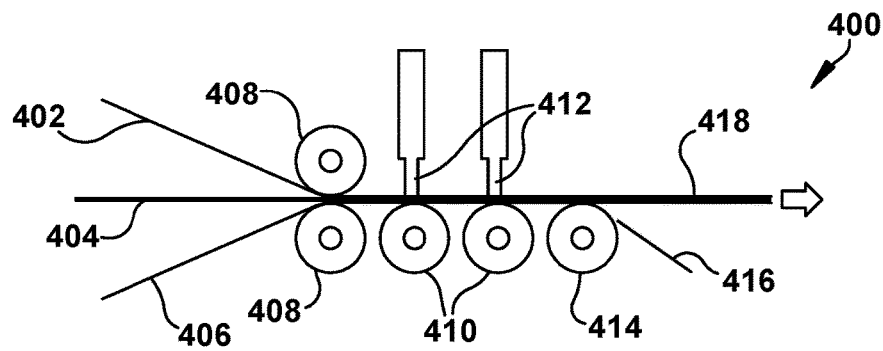
FIG. 4 depicts a first embodiment of roll-to-roll processing with ultrasonic welding.

Referring to FIG. 4, a first embodiment of roll-to-roll processing 400 is presented. In the roll-to-roll processing 400, a lamination roll 408 receives a top printed fabric label layer 402, a substrate with RFID inlays 404, and a bottom printed fabric label layer 406. The lamination roll 408 presses together, or joins together, the top printed fabric label layer 402, the substrate with RFID inlays 404, and the bottom printed fabric label layer 406 to form a joined label. In certain embodiments, waterproof layers (not shown, see FIGS. 2 and 3) can be disposed between the top printed fabric label layer 402 and the RFID inlays 404, and/or the bottom printed fabric label layer 406 and the RFID inlays 404. In embodiments the waterproof layers can be pre-applied to the top printed fabric label layer 402 and/or the bottom printed fabric label layer 406.

The joined label passes between ultrasonic welders 412 and rotary anvils 410. The ultrasonic welders 412 weld the top printed fabric label layer 402 to the bottom printed fabric label layer 406 to form a seal around one of the RFID chips and antennas of the RFID inlay 404. In embodiments, the ultrasonic weld extends through one or more other layers, for example the RFID inlay 404 and waterproofing layers if present. The weld can be in any suitable shape, for example a substantially rectangular weld. Any suitable number of ultrasonic welders 412 can be utilized. For example, in embodiments a first ultrasonic welder 412 seals the edges of the joined label and a second ultrasonic welder 412 seals the ends of the joined label. Once sealed, the labels exit the ultrasonic welders 412 and rotary anvils 410 as a continuous web 418. An edges slitting roller 414 trims the edges of the continuous web 418 and slit waste 416 is discard. The continuous web 418 of individually sealed labels can be rolled or otherwise suitably packaged for future use. For example, the continuous web 418 can be delivered to a garment manufacturer where individual labels can be cut from the continuous web 418 and attached to garments by the garment manufacturer.

Figure 5:
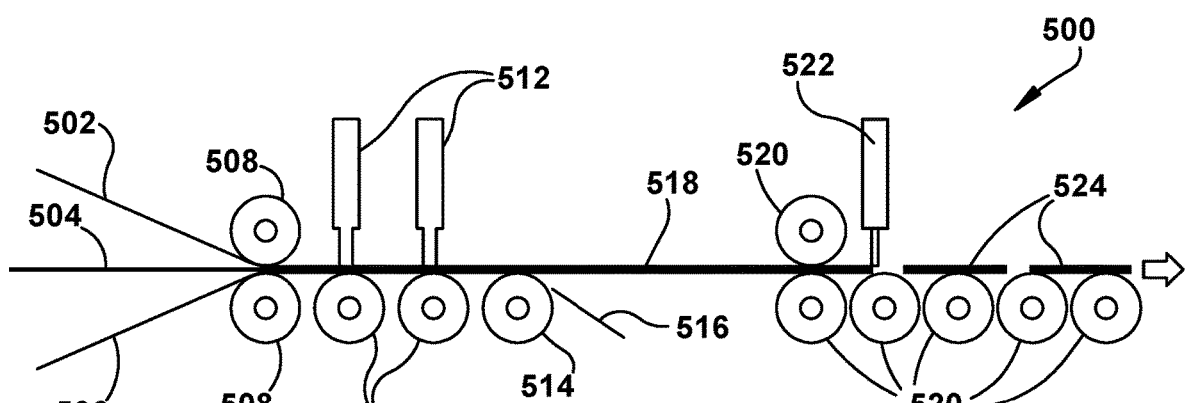
FIG. 5 depicts a second embodiment of roll-to-roll processing with ultrasonic welding.

Referring now to FIG. 5 a second embodiment of roll-to-roll processing 500 is presented. As describe above, in the roll-to-roll processing 500 a top printed fabric label layer 502, a substrate with RFID inlays 504, and a bottom printed fabric label layer 506 are pressed and joined together by a lamination roll 508, and welded between ultrasonic welders 512 and rotary anvils 510. An edges slitting roller 514 trims the edges of the continuous web 518 and slit waste 516 is discard. The continuous web 518 passes between web guides 520 and a sonic knife 522 cuts the continuous web 518 into individual labels 524 that each contain an RFID chip and antenna. The individual labels 524 are dispensed by the web guides 520 after which the individual labels 524 can be attached to a garment or packaged together for delivery to a garment manufacturer.

Figure 6:
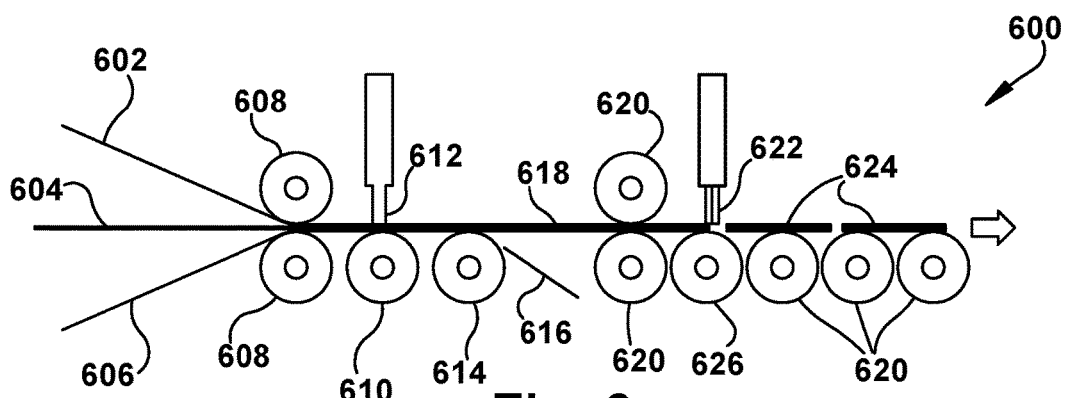
FIG. 6 depicts a third embodiment of roll-to-roll processing with ultrasonic welding.

Referring now to FIG. 6 a third embodiment of roll-to-roll processing 600 is presented. As describe above, in the roll-to-roll processing 600 a top printed fabric label layer 602, a substrate with RFID inlays 604, and a bottom printed fabric label layer 606 are pressed and joined together by a lamination roll 608. The joined label is first welded along the sides by a first ultrasonic welder 612 and a first rotary anvil 610. The welded sides are then trimmed by an edges slitting roller 614 and slit waste 616 is discard. The continuous web 618 passes between a first pair of web guides 620 and a second ultrasonic welder 622 welds the ends of the individual labels 624 in the continuous web 618 against a second rotary anvil 626. The second ultrasonic welder 622 includes a sonic knife that cuts the welded ends to form individual labels 624 from the continuous web 618. The individual labels 624 are dispensed by the web guides 620 after which the individual labels 624 can be attached to a garment or packaged together for delivery to a garment manufacturer. As can be appreciated, the ultrasonic welder can substantially simultaneously weld and cut the individual labels or perform the ultrasonic weld and sonic cut in separate steps.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. A label having visible printing, comprising:
   a first layer;
   a second layer ultrasonically welded to the first layer; and
   at least one radio frequency identification ("RFID") inlay disposed between the first layer and the second layer,
   wherein the first layer and the second layer are printed fabric layers,
   wherein the visible printing is arranged on the first layer and the second layer and is visible on outward facing sides of the first layer and the second layer,
   wherein the first layer and the second layer are outermost layers of the label.

2. The label of claim 1, wherein the at least one RFID inlay comprises an RFID chip in electrical communication with an antenna.

3. The label of claim 1, wherein the at least one RFID inlay comprises an RFID strap in electrical communication with an antenna.

4. The label of claim 1, further comprising:
   an adhesive configured to secure the at least one RFID inlay to the first printed fabric layer.

5. The label of claim 1, further comprising:
   a waterproof layer disposed directly between the at least one RFID inlay and the second printed fabric layer.

6. The label of claim 5, further comprising:
a second waterproof layer disposed directly between the at least one RFID inlay and the first printed fabric layer.

7. The label of claim 1, wherein the label has four edges and wherein the second printed fabric label layer is ultrasonically welded to the first printed fabric layer substantially along the four edges of the label.

8. The label of claim 1, wherein the at least one RFID inlay comprises:
a plurality of inlays and the plurality of inlays are periodically spaced so as to substantially align with artwork in the printed fabric layers.

9. A roll-to-roll label processing apparatus, comprising:
a lamination roll configured to receive a first printed fabric label layer, an radio frequency identification ("RFID") inlay, and a second printed fabric label layer, and press the RFID inlay between the first printed fabric label layer and the second printed fabric label layer to form a joined label; and
one or more ultrasonic welders configured to ultrasonically weld portions of the second printed fabric label layer to the first printed fabric layer against one or more corresponding rotary anvils to form a continuous web of labels,
wherein visible printing is arranged on the first layer and the second layer and is the visible printing is visible on outward facing sides of the first layer and the second layer,
wherein the first layer and the second layer are outermost layers of the label.

10. The roll-to-roll label processing apparatus of claim 9, further comprising: an edges slitting roller configured to trim the sides of the continuous web.

11. The roll-to-roll label processing apparatus of claim 9, further comprising:
a plurality of web guides configured to receive the continuous web; and
a sonic knife configured to separate individual labels from the continuous web,
wherein each individual label includes an RFID inlay.

12. The roll-to-roll label processing apparatus of claim 9, further comprising
a plurality of web guides configured to receive the continuous web, and
wherein at least one ultrasonic welder includes a sonic knife configured to separate individual labels from the continuous web.

13. The roll-to-roll label processing apparatus of claim 9, wherein the RFID inlay comprises an RFID chip in electrical communication with an antenna.

14. The roll-to-roll label processing apparatus of claim 9, wherein the RFID inlay comprises an RFID strap in electrical communication with an antenna.

15. The roll-to-roll label processing apparatus of claim 9, wherein the first printed fabric label layer further includes a waterproof layer configured to be disposed between the first printed fabric layer and the RFID inlay.

16. The roll-to-roll label processing apparatus of claim 15, wherein the second printed fabric label layer further includes a second waterproof layer configured to be disposed between the second printed fabric layer and the RFID inlay.

17. The roll-to-roll label processing apparatus of claim 9, wherein the RFID inlay includes an adhesive configured to secure the RFID inlay to the first printed fabric layer.

18. A method, comprising:
receiving, by a lamination roll, a first printed fabric label layer, a plurality of radio frequency identification ("RFID") inlays, and a second printed fabric label layer;
joining, by the lamination roll, the first printed fabric label layer, the plurality of RFID inlays, and the second printed fabric label layer; and
ultrasonically welding, by an ultrasonic welder, portions of the second printed fabric layer to the first printed fabric label layer to seal one or more RFID inlays between the first printed fabric layer and the second printed fabric layer to form a continuous web of individual labels each including at least one RFID inlay,
wherein visible printing is arranged on the first layer and the second layer and is the visible printing is visible on outward facing sides of the first layer and the second layer,
wherein the first layer and the second layer are outermost layers of the label.

19. The method of claim 18, further comprising:
trimming, by an edge slitting roller, edges of the continuous web of individual labels.

20. The method of claim 19, further comprising:
separating, by a sonic knife, the individual labels from the continuous web of individual labels.

* * * * *